United States Patent
Reuther et al.

[11] Patent Number: 5,574,226
[45] Date of Patent: Nov. 12, 1996

[54] TRANSPORTABLE ENVIRONMENTAL TEST FACILITY

[75] Inventors: Kenneth R. Reuther, Plymouth; Stephen A. Nolan, Ferndale; Richard W. Squires, Commerce Township; Mark N. Maskill, Birmingham; Mark W. Talley, Farmington, all of Mich.

[73] Assignee: Ford Motor Company, Dearborn, Mich.

[21] Appl. No.: 417,522

[22] Filed: Apr. 6, 1995

[51] Int. Cl.[6] .................................................. G01N 29/00
[52] U.S. Cl. ........................................... 73/669; 73/865.6
[58] Field of Search ........................... 73/11.04, 11.09, 73/117, 117.1, 118.1, 865.6, 669, 670

[56] References Cited

U.S. PATENT DOCUMENTS

| | | | |
|---|---|---|---|
| 3,164,003 | 1/1965 | MacMillan | 73/11 |
| 3,695,098 | 10/1972 | Kirkland, Jr. | 73/117.1 |
| 3,748,896 | 7/1973 | Barrows | 73/71.5 |
| 3,827,289 | 8/1974 | Borg | 73/71.7 |
| 4,689,998 | 9/1987 | Jackson et al. | 73/669 |
| 5,148,703 | 9/1992 | Vaughan et al. | 73/123 |
| 5,198,980 | 3/1993 | Patrick | 364/424.03 |
| 5,216,923 | 6/1993 | Brett | 73/827 |

FOREIGN PATENT DOCUMENTS 257297  4/1911  Germany.

OTHER PUBLICATIONS

S. A. Nolan, "Portable Production Test Four Poster Budgetary Quotation", Oct.–Nov., 1989, (Not Prior Art).

Primary Examiner—Robert Raevis
Attorney, Agent, or Firm—Donald A. Wilkinson; Roger L. May

[57] ABSTRACT

An environmental test facility for testing vehicle suspension and body components is disclosed. The test facility is transportable over conventional roads and is essentially self-contained for set-up at manufacturing facilities or other locations to facilitate testing of vehicles. A four-poster hydraulic suspension test simulator is provided. A temperature-controlled environment and simulated sunlight sources may also be provided.

15 Claims, 6 Drawing Sheets

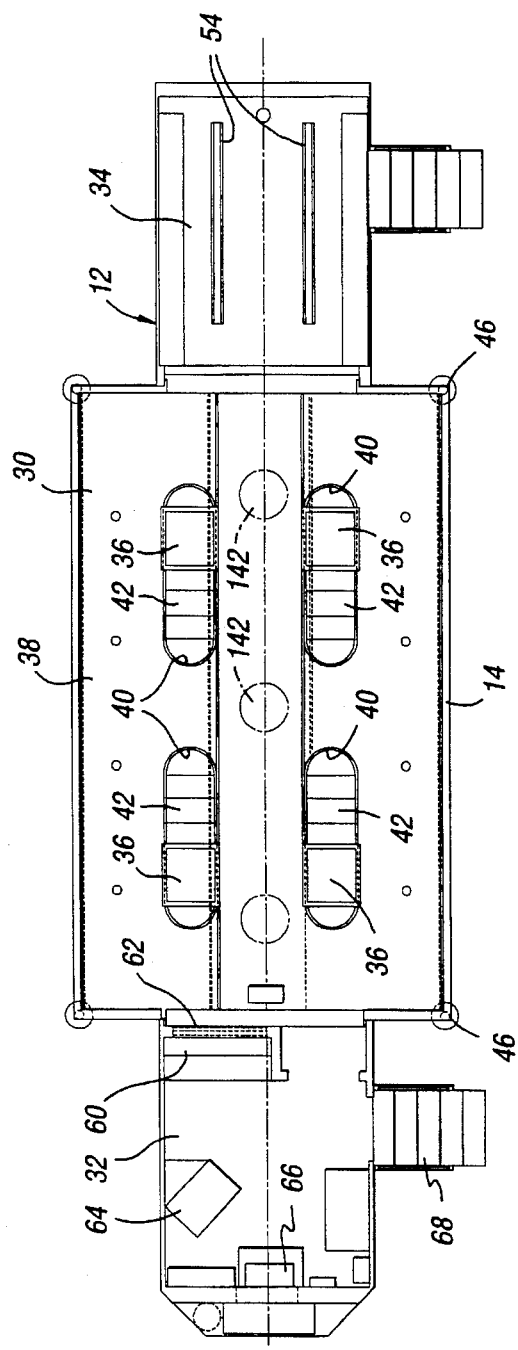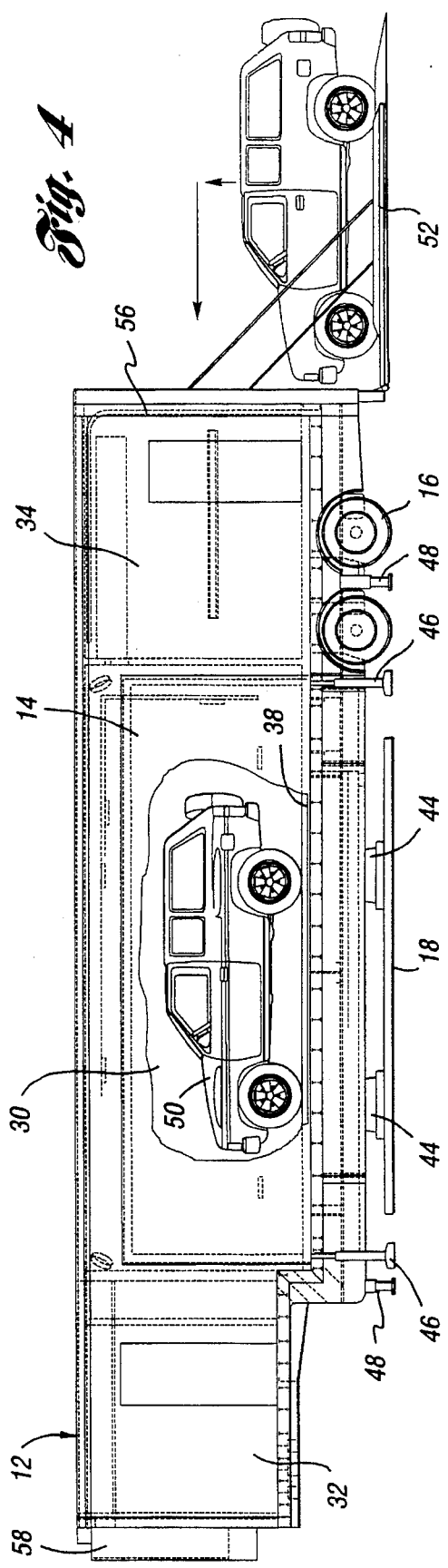

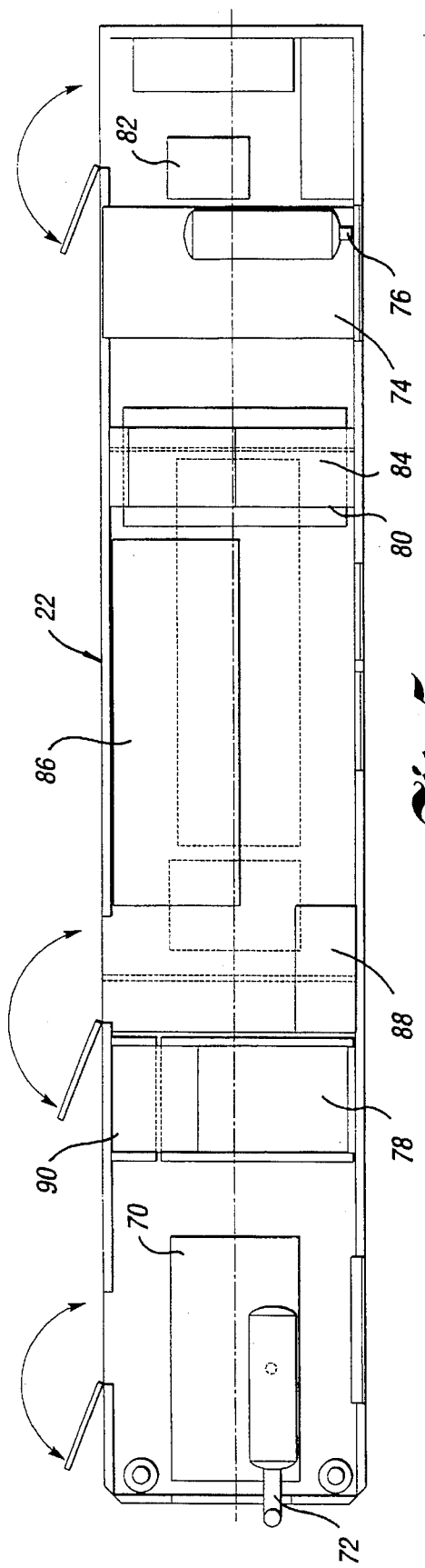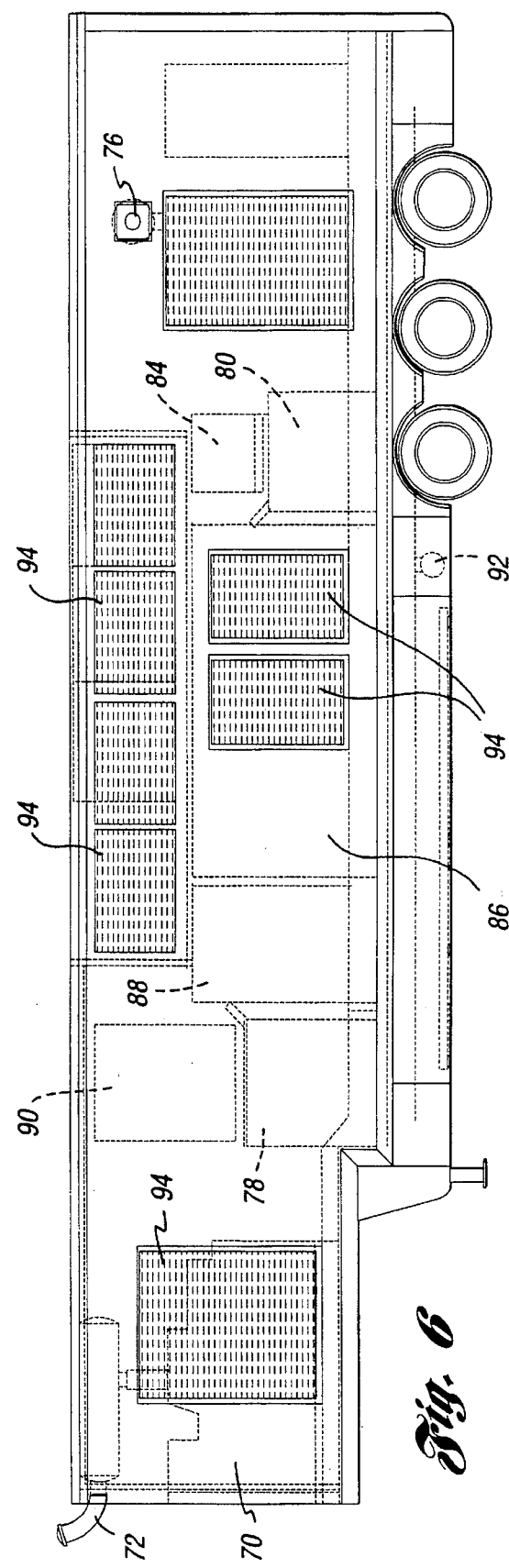

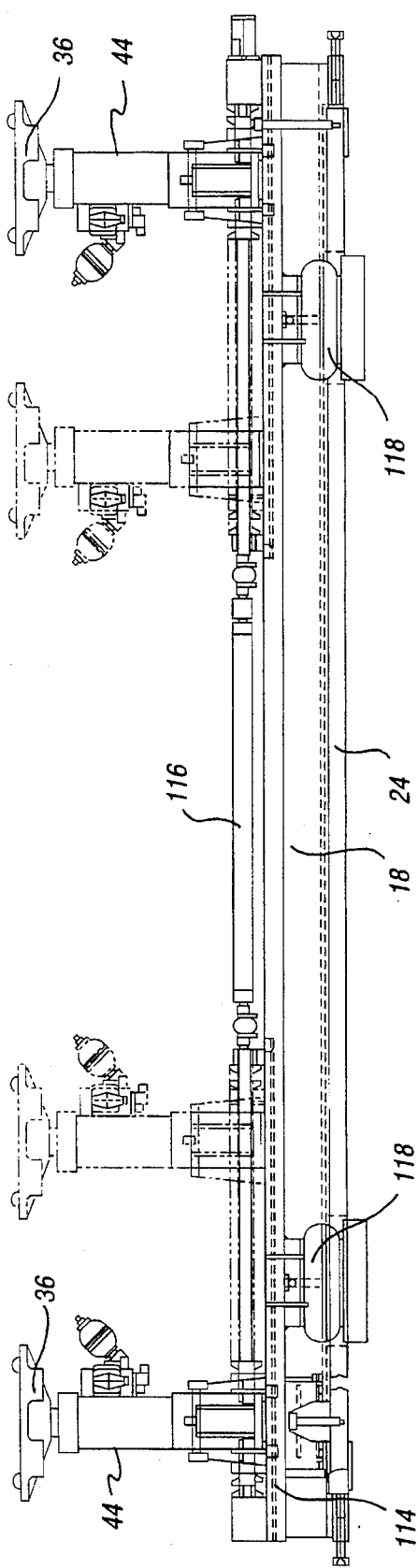
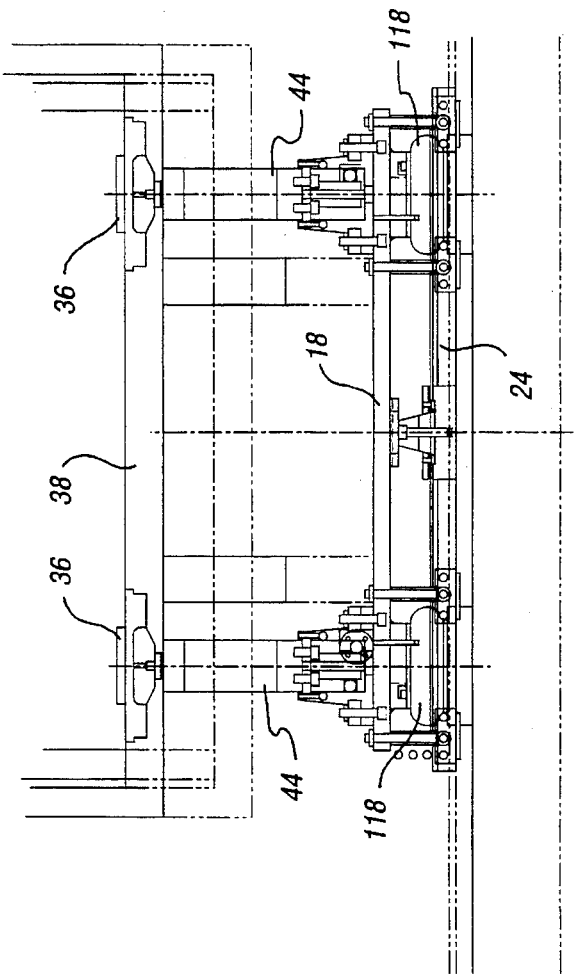

5,574,226

TRANSPORTABLE ENVIRONMENTAL TEST FACILITY

TECHNICAL FIELD

The present invention relates to trailermounted road simulator environmental test facilities for vehicles.

BACKGROUND ART

As part of the ongoing objective of automotive manufacturers of producing quality automotive vehicles, every effort is made to ensure that new vehicles are quiet and essentially free of squeaks and rattles. Testing for such problems is particularly important upon new vehicle roll out when body parts and subassemblies are first assembled as a production vehicle.

Previously, one or more vehicles were shipped from the assembly line back to a stationary test facility during vehicle roll out where they were tested on a stationary four-poster hydraulic test setup through a series of vibration tests. The vehicle could also be tested in temperature cycles and in simulated sunlight. The results of the testing was communicated back to the assembly plant at the earliest within several days or a few weeks of the assembly line start-up. With two shift operation, this can mean that 1,000 cars per day may be produced with an annoying squeak or rattle that can, in some instances, be eliminated as a running change. Since it is much less expensive to eliminate problems during assembly than as a warranty repair post assembly, significant savings can be achieved if the time between manufacture and problem identification is reduced.

In addition to squeak and rattle problem detection, problems relating to temperature cycling and durability relating to sunlight exposure have generally been conducted at stationary test facilities or remote proving grounds to which cars are transported from the assembly plants.

Environmental test facilities are most useful during initial vehicle roll out because once the vehicle design and assembly techniques are finalized, most problems have been eliminated and there is a reduced need for ongoing testing. The cost of environmental test facilities including a four-poster suspension testing system is substantial and it is economically unfeasible to include a stationary test facility at each assembly plant.

Four-poster hydraulic test units require predetermined seismic masses to assure accurate and repeatable test results. Over 100,000 pound seismic masses are used to assure testing accuracy. In stationary test facilities, the four-poster is permanently mounted on a concrete base which forms the seismic mass.

Extensive computer simulations and simulations based upon actual drive profiles have been developed for use at the stationary test facilities so that almost any driving surface such as gravel roads, potholes, cobblestone roads, smooth roads with expansion joints, or the like can be simulated for various time periods. Such testing offers the advantage of allowing a vehicle to be tested for drivability, squeaks and rattles in various road conditions without actually driving the vehicle and subjecting it to wear and tear or otherwise being damaged in the course of driving.

These and other disadvantages and problems have been overcome and resolved by the present invention as summarized below.

SUMMARY OF THE INVENTION

According to one aspect of the invention, a transportable environmental test facility for a vehicle is provided. The transportable environmental test facility includes a trailer having an enclosure and a trailer bed that are supported for transportation on trailer wheels in the manner of known tractor-trailer vehicles. A plurality of hydraulic actuators are associated with the bed of the trailer and specific seismic mass. Each hydraulic actuator is adapted to engage one of the tires of the vehicle to be tested. A hydraulic system including hydraulic valves is provided. A controller is operatively associated with each of the hydraulic actuators to cause the actuators to move by controlling the hydraulic valves which, in turn, cause the wheels of the vehicle to be tested to move in a controlled manner relative to the seismic mass.

According to related aspects of the invention, four actuators are preferably provided for a four-wheel vehicle test set-up. The four actuators are preferably independently controllable so that a full range of road surface conditions can be simulated. The four actuators are also preferably adjustably secured to the bed of the trailer to accommodate vehicles of different wheel base lengths. The actuators are preferably hydraulic cylinders that are capable of rapid extension and retraction so that impacts on road surfaces by a vehicle traveling at relatively high speeds may be simulated.

The transportable environmental test facility of the present invention preferably utilizes a computer simulator. The computer simulator is adapted to simulate a wide variety of road conditions based upon previously recorded actual wheel movements recorded as the vehicle passes over known road surfaces. The computer simulator may also include the capability of providing a predetermined range of frequencies or a frequency spectrum especially developed for testing applications.

According to another aspect of the invention, a seismic mass may be transported with a transportable environmental test facility. The seismic mass may also be provided by providing an inground cement pad with plates to which the four-poster can be secured. As another alternative, an in-ground seismic mass and transported seismic mass may be coupled together to provide a known seismic mass.

A split seismic mass may be transported by two trailers with one portion of the seismic mass being provided by the test trailer and another portion of the seismic mass being detachable from a utility trailer. The utility trailer can also be used to transport a portion of the seismic mass that can be detached from the utility trailer and secured to a seismic mass carried by the test trailer. One advantage to being able to split the seismic mass is that it enables the trailers to utilize existing roadways or routing. The seismic masses can be placed on a level surface and can provide accurate test data through approximately 80% of most currently utilized test loads. If a suitably level surface is unavailable at the location that the transportable environmental test facility is to be used, an air bag similar to the air pads on air ride trailer suspension can be used to support the seismic mass.

According to another aspect of the invention, a second trailer is provided as part of the transportable environmental test facility which is separate from the trailer in which the vehicle is tested. The second trailer preferably houses generators and a hydraulic pump which can provide electrical power and hydraulic power to the test trailer. By placing the generators and hydraulic pump and equipment in a separate trailer, noises and vibrations from such devices are isolated from the test cell.

The utility trailer can also provide air conditioning compressors and other systems that are necessary to support the test trailer. The utility trailer is preferably connected to the test trailer by means of electrical wires and hydraulic hoses or tubing that are preferably bundled within large tubes or conduits.

The test trailer preferably is a trailer including a ramp-type lift for facilitating loading a vehicle into the rear of a trailer. The sides of the trailer preferably telescope outwardly on both sides to provide clearance around the vehicle when it is in place on the four-poster test set-up. The trailer floor is preferably a folding floor which is hinged to pivot upwardly when the sides are placed in their contracted position. When the sides are telescoped outwardly, the folding floor is lowered hydraulically into place providing adequate clearance around the vehicle to be tested.

The test trailer is also preferably provided with heating and cooling systems that allow for temperature control from −20° to 140° F. The trailer is also preferably provided with substantial sound insulation and temperature insulation.

Another test that can be performed in the transportable environmental test facility is sunlight testing simulations wherein ultraviolet lights simulating sunlight can be directed at certain portions of the vehicle or over the entire vehicle surface to test for durability when exposed to sunlight. The test trailer is also preferably provided with a dehumidifier whereby humidity can be removed from the test trailer to provide an additional controlled parameter for testing purposes.

According to another aspect of the invention, a transportable environmental test facility for a vehicle may be provided wherein a trailer having an enclosure and a bed may be provided with environmental test equipment such as temperature controls, humidity controls and sunlight simulators without the inclusion of a four-poster suspension testing system. The test trailer could include telescoping sides, soundproofing and insulation much as is provided in the embodiment described above. Such a test unit could be stand alone test trailer not requiring a utility trailer.

It is also conceivable that the utility trailer and test trailer including a four-poster suspension testing set-up could be provided in a single oversized trailer.

These and other advantages of the present invention will be better understood upon review of the attached drawings in light of the following detailed description of a preferred embodiment of the invention.

BRIEF DESCRIPTION OF THE DRAWINGS

FIG. 3 is a top elevation view of the floor plan of the test trailer expanded for testing;

FIG. 4 is a side elevation of a test trailer partially broken away to show a vehicle in the test cell;

FIG. 5 is a plan view showing the floor plan of the utility trailer;

FIG. 6 is a side elevation view of the utility trailer;

FIG. 9 is a fragmentary rear elevation view of the four-poster assembly with the seismic mass supported on air bags;

FIG. 10 is a schematic view showing the equipment layout for the transportable environmental test facility.

BEST MODE FOR CARRYING OUT THE INVENTION

Figure 1:
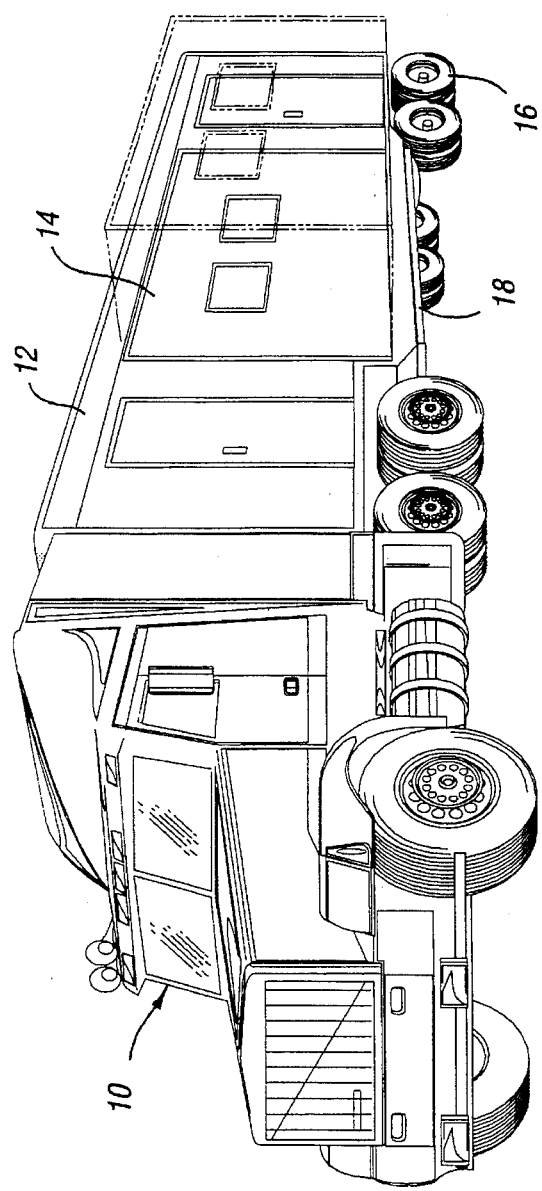
FIG. 1 is a perspective view of a tractortrailer including the test trailer of the present invention.

Referring now to FIG. 1, a test truck 10 is shown including a test trailer 12. The test truck 10 is a conventional tractor-trailer truck which has a specially modified test trailer having two telescopic side portions 14. The test trailer 14 is a conventional trailer having wheels 16 associated with a seismic mass 18 which is carried by the trailer for use with the test simulator as will be explained more fully below.

Figure 2:
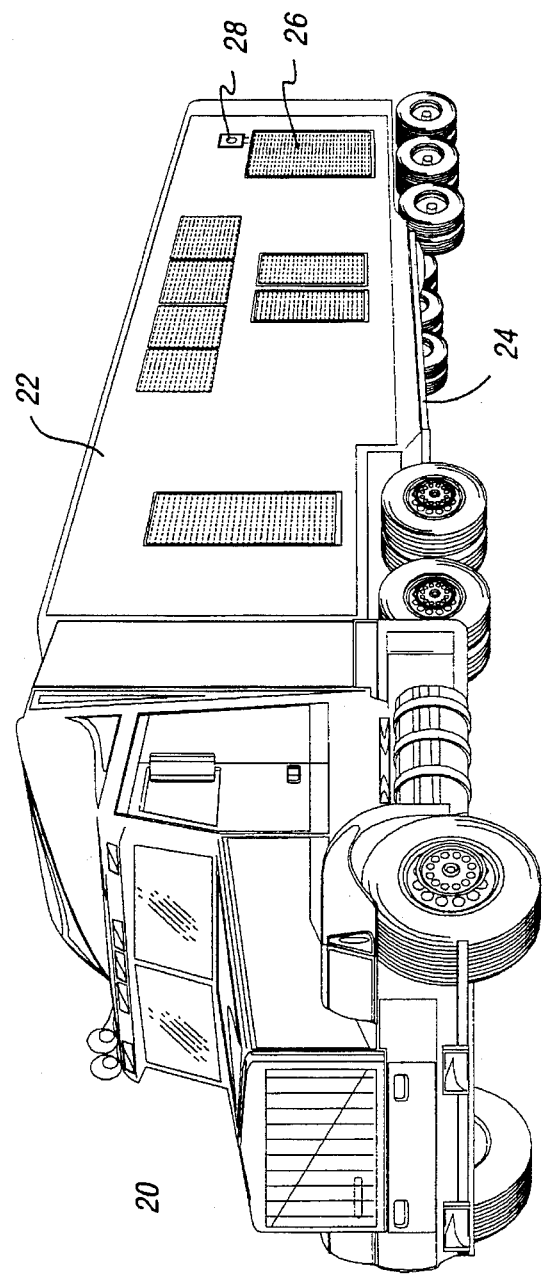
FIG. 2 is a perspective view of a tractortrailer combination including the utility trailer of the present invention.

Referring now to FIG. 2, a utility truck 20 is shown which includes a utility trailer 22. The utility trailer 22 carries a seismic mass 24 which is adapted to be used in conjunction with the seismic mass 18 on the test trailer 12. The trailer includes vents 26 for providing air to the trailer and a generator exhaust port 28.

Referring now to FIGS. 3 and 4, the test trailer 12 is shown in greater detail. The test trailer includes a test cell 30 in which environmental testing is performed including tests for vibration, squeaks, rattles, temperature and ultraviolet testing. A control room 32 is provided within the test trailer 12 to control and observe testing in the test cell 30. A vehicle loading area 34 is provided within the trailer 12 at the opposite end of the trailer from the control room 32. A principle testing function is testing new vehicles for squeaks and rattles under simulated driving conditions. Four hydraulic actuator tire plates 36 are provided in the floor 38 of the trailer 12. The hydraulic actuator tire plates 36 are disposed in elongated openings 40 in the floor 38 so that the hydraulic actuator tire plates 36 may be located in a range of spacings corresponding to anticipated wheel base dimensions. Removable actuator seal plates 42 are placed in the elongated openings 40 to cover the elongated openings on either side of the hydraulic tire plates 36.

Four hydraulic actuators are provided in the floor 38 and extend below the trailer 12 to provide a portable four-poster test apparatus. The trailer 12 is provided with four manual support pedestals 46 which are used to level and stabilize the trailer 12 when the telescopic side portions 14 are extended. Hydraulic leveling posts 48 are also provided to level the trailer after it is located for use.

A vehicle 50 to be tested is shown in the test cell 30 in FIG. 4 and shown in phantom on a lift gate 52. A vehicle 50 to be tested is driven onto the lift gate 52 which lifts the vehicle up to the level of the floor 38 so that the vehicle can be driven onto the tire plates 36.

In the vehicle loading area 34, tie-down tracks 54 are provided for tying down the equipment to be transported when the trailer is in its portable mode. A roll-down door 56 is preferably provided to close the back of the test trailer 12.

A heating and cooling system 58 is provided for heating and cooling the control room 32 keeping it at a comfortable temperature that is maintained separately of the test cell 30. Within the control room 32 are provided a computer terminal 60 and a window 62 which permits viewing of the vehicle in the test cell 30 from the control room 32. A computer rack 64 is provided for controlling and monitoring tests in the test cell 30. A monitoring recorder 66 is preferably provided within the control room for recording environmental information such as the temperature and humidity within the test cell. Portable stairways 68 provide access to the control room 32 in vehicle loading area 34.

Referring now to FIGS. 5 and 6, the utility trailer 22 will be described in greater detail. The utility trailer houses a generator 70 having its own exhaust 72 and a generator 74 having an exhaust 76. Two fuel tanks 78 and 80 are provided to provide fuel for the generators 70 and 74. A power transformer 82 is provided in the utility trailer 22 as well as an air compressor 84. Transformer 82 and air compressor 84 provide power and compressed air to the test trailer 12 from a remote location.

A heating and cooling system 86 is provided in the utility trailer 22 for controlling conditions both within the utility trailer 22 and the test cell 30. A transfer switch 88 is provided in the utility trailer. A hydraulic power supply 90 is provided in the utility trailer to provide hydraulic power to the test cell for hydraulic actuators 44 and for operation of other hydraulically powered components of both the test trailer 12 and utility trailer 22. A compressed air tank 92 is preferably provided below the utility trailer 22 for accumulating compressed air to be supplied to the test trailer 12. A plurality of air intakes 94 are provided on the utility trailer to allow for fresh air to be taken into the utility trailer.

Figure 7:
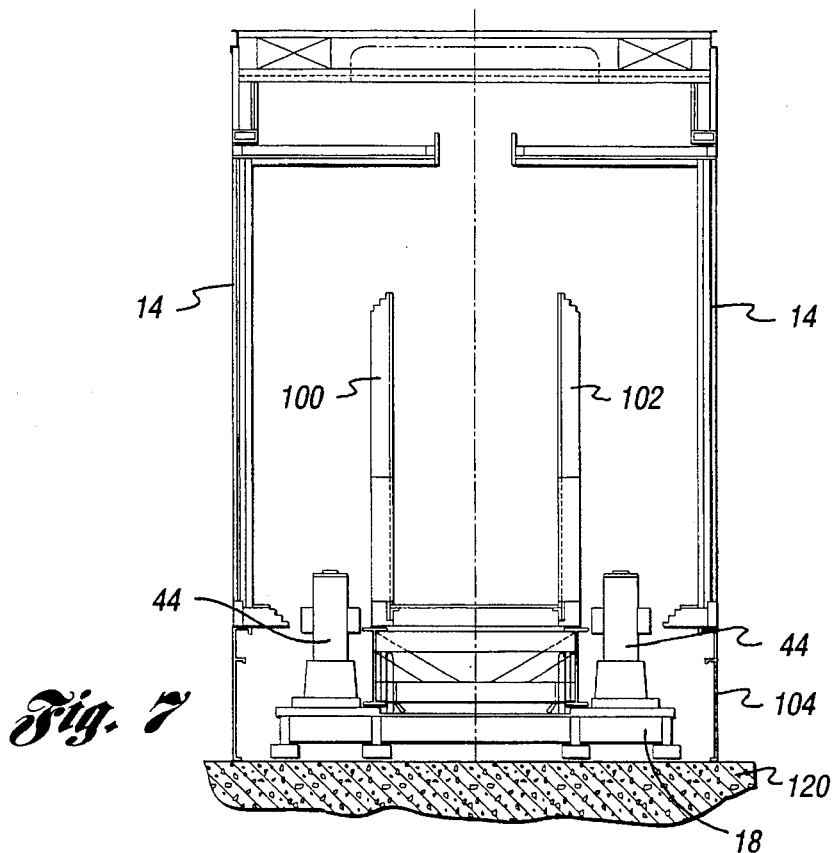
FIG. 7 is a cross-sectional view of the test trailer showing the sides of the trailer telescoped inwardly and the floor folded.
Figure 8:
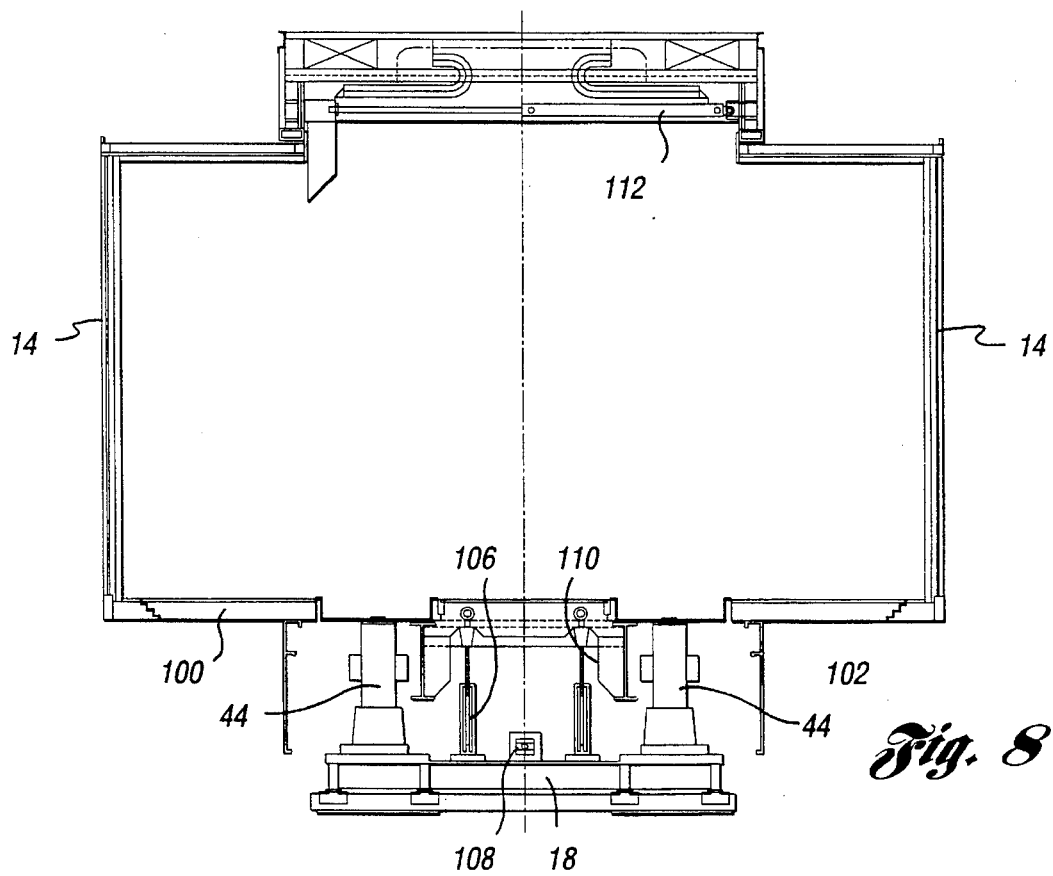
FIG. 8 is a cross-sectional view showing the sides of the trailer and floor deployed in their telescoped outward position.

Referring now to FIGS. 7 and 8, hinged floor sections 100 and 102 are shown in FIG. 7 in their retracted or portable position. Hinged floor sections are moved to a horizontal position when the telescopic side portions 14 are extended as shown in FIG. 8. A plurality of hinged side skirts 104 are provided to cover and protect the components of the test trailer 12 that are located below the trailer.

Referring now to FIG. 8, a lifting sheave 106 and seismic mass lift cylinder 108 and cable 110 cooperate to provide a mechanism for raising and lowering the seismic mass 18 on the test trailer 12. A hydraulic actuator 112 for the telescopic side portions 14 is shown in FIG. 8.

Referring now to FIG. 9 and 10, the adjustable hydraulic actuators of the four poster are shown in greater detail. The hydraulic actuators 44 support the tire plates 36 and are installed in the floor 38 of the test trailer 12 to be adjustable to a wide range of wheel base lengths as shown with the maximum wheel base length being shown in solid lines and a reduced wheel base being shown in phantom lines in FIG. 9. The hydraulic actuators move along a track 114 when driven by an adjustment drive 116 that may be either a hydraulic drive or screw drive. The seismic masses 18 and 24 are designed to work in conjunction with an air cushion 118 associated with each of the hydraulic actuator posts 44 to isolate the seismic mass and provide an accurate simulation without the need for a special foundation.

The present invention may also be used with a special permanent seismic mass to achieve stationary laboratory accuracy in a portable environmental test apparatus. For instance, a seismic mass comprising 120,000 pounds of concrete may be provided at an automotive assembly plant to which the test trailer can be secured by means of appropriate plates and fasteners. The seismic mass 18 of the test trailer can be bolted to the permanent in-ground seismic mass 120.

An infrared transmitter 130 is preferably provided for use so that a test engineer observing a car within the test cell 30 can control various testing functions. The IR transmitter 130 is adapted to communicate with an IR receiver 132 in the test truck control room.

Figure 11:
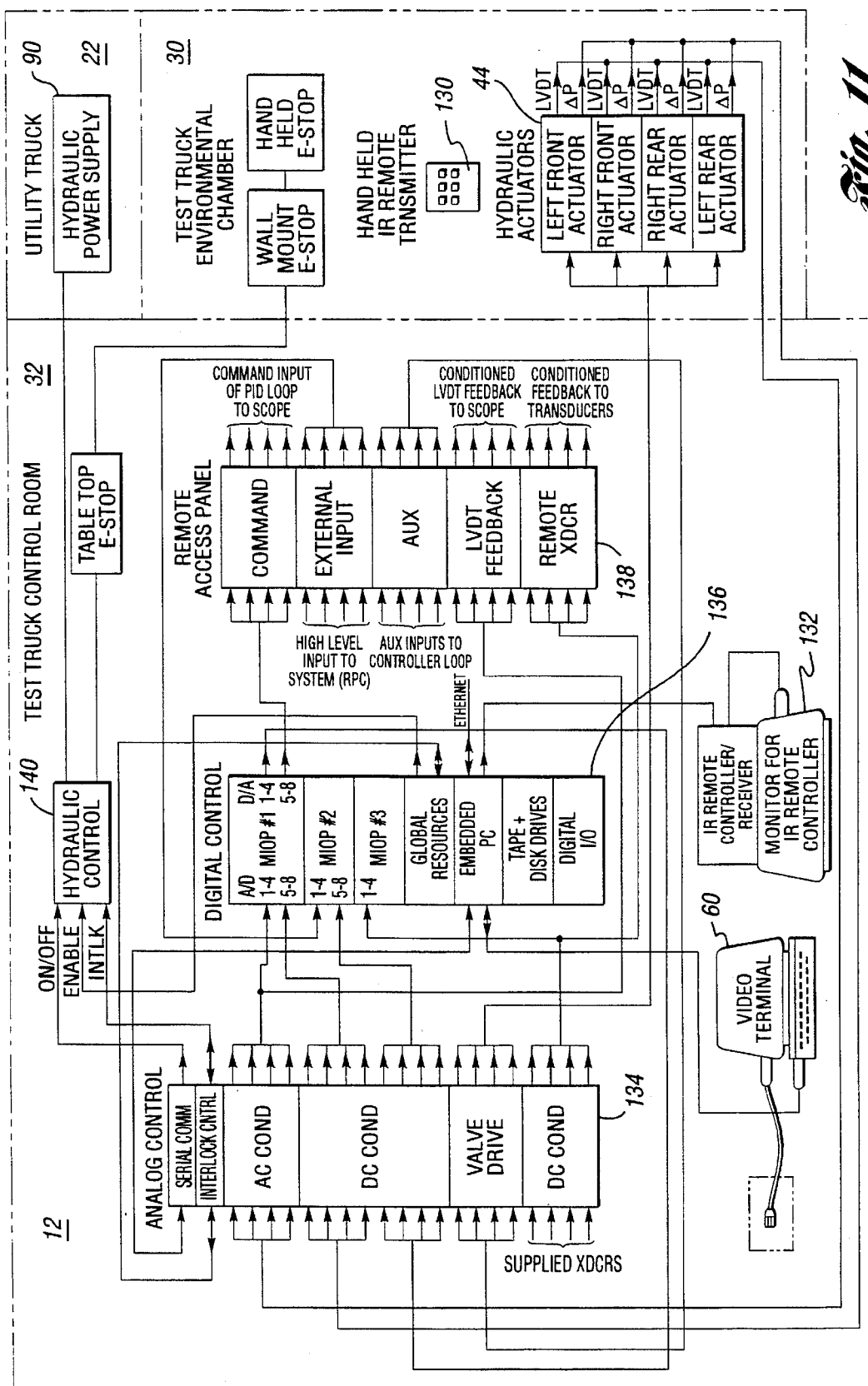
FIG. 11 is a system functional drawing of the utility trailer and test trailer control system.

Referring to FIG. 11, a block diagram showing the control and functional relationship of the utility trailer 22 and test trailer is shown. Ideally, the utility truck provides electrical power, hydraulic power and pneumatic power to the test trailer 12. All the power generation and conversion functions performed in the utility trailer 22 are done at a remote location relative to the test trailer 12 so that noise and vibration emanating from the power generation and hydraulic pumps and the like will not interfere with observations and testing conducted within the test truck control room 32. Hydraulic power is controlled within the test truck control room 32 by means of hydraulic valves which are driven by an analog control 134.

The analog control 34 includes circuits for conditioning an AC/DC power supply. A digital control 136 is provided for controlling the test system and generating simulated testing inputs. Simulated testing inputs can be taken from data storage media made by specially adapted cars that record driving conditions over potholes, gravel, smooth roads and the like.

The exposure of vehicles to extreme cold of up to −20° F. or warm temperatures of up to 140° F. can be simulated within the test cell.

A remote access panel 138 is provided in the control room to integrate the analog and digital control. A hydraulic control 140 is provided within the test truck control room to control hydraulic valves that control the hydraulic actuators 44.

Referring to FIG. 3, sunlamps 142 can be provided above the vehicle in the test cell to provide simulated sunlight within the test trailer to test for durability of components and finishes when exposed to sunlight. Sunlamps can be installed as track lights or positional lighting to allow for flexibility in lamp location.

The preceding description of a preferred embodiment of the present invention is intended to exemplify a preferred embodiment of the present invention. Other variations are possible as will be understood by one of ordinary skill in the art including the use of a single test trailer which would include all of the equipment provided in the test trailer and utility trailer. The broad scope of the present invention should be construed by reference to the following claims.

We claim:

1. A transportable environmental test facility for testing a vehicle having a plurality of wheels comprising:

a trailer having an enclosure, a trailer bed and trailer wheels, said vehicle being entirely enclosed in the enclosure of the trailer to provide a controlled environment for testing;

a plurality of hydraulic actuators being secured to the trailer bed and a seismic mass,each hydraulic actuator being adapted to support one of the wheels of the vehicle to be tested;

a hydraulic fluid circuit including the hydraulic actuators; and a controller operatively associated with the hydraulic fluid circuit and hydraulic actuators causing the wheels of the vehicle to be tested to move vertically in a controlled manner relative to the seismic mass to simulate vehicle operating conditions.

2. The transportable environmental test facility of claim 1 wherein said plurality of hydraulic actuators comprise four hydraulic actuators secured to the trailer bed to engage four wheels of the vehicle to be tested.

3. The transportable environmental test facility of claim 1 wherein each of said plurality of hydraulic actuators is independently controllable by the controller.

4. The transportable environmental test facility of claim 1 wherein said hydraulic actuators include a pair of front wheel actuators and a pair of rear wheel actuators which are secured to the trailer bed in a range of positions corresponding to a predetermined wheelbase dimension of the vehicle to be tested.

5. The transportable environmental test facility of claim 1 wherein said hydraulic actuators are hydraulic cylinders mounted on the seismic mass located below the trailer bed.

6. The transportable environmental test facility of claim 1 wherein said controller is a computer simulator having a recorded series of commands for operating the hydraulic actuators in a manner corresponding to the movements of a vehicle's wheels passing over a road surface to be simulated.

7. The transportable environmental test facility of claim 1 wherein said controller is a computer programmed to operate the hydraulic actuators in a range of frequencies.

8. The transportable environmental test facility of claim 1 wherein said trailer further includes a control room and a test cell located within the enclosure of the trailer, said control room having a work station for controlling the environment within the test cell and for controlling inputs for the hydraulic actuators, said control room and said test cell being separately environmentally controlled so that a comfortable environment can be maintained in the control room while the test cell may be provided with more extreme environments.

9. The transportable environmental test facility of claim 8 wherein a window is provided between the control room and the test cell allows for visual observation of the vehicle in the test cell from the control room.

10. The transportable environmental test facility of claim 8 wherein a portable transmitter is used to communicate with the work station from within the vehicle in the test cell.

11. The transportable environmental test facility of claim 8 wherein the test cell includes sound and thermal insulation and a temperature modification and control system.

12. The transportable environmental test facility of claim 1 wherein said seismic mass is at least partially transported by the trailer.

13. A transportable environmental test facility for a vehicle to be tested having a plurality of wheels comprising:

a trailer having an enclosure, a trailer bed and trailer wheels;

a plurality of hydraulic actuators associated with the trailer bed and a seismic mass, each hydraulic actuator being adapted to engage one of the wheels of the vehicle to be tested;

a hydraulic fluid circuit including the hydraulic actuators;

a controller operatively associated with the hydraulic fluid circuit actuators causinq the wheels of the vehicle to be tested to move in a controlled manner relative to the seismic mass; and a second seismic mass provided in ground at a location where the transportable environmental test facility is temporarily installed, said first and second seismic masses beinq adapted to be secured together for testing.

14. A transportable environmental test facility for a vehicle to be tested having a plurality of wheels comprising:

a trailer having an enclosure, a trailer bed and trailer wheels;

a plurality of hydraulic actuators associated with the trailer bed and a seismic mass, each hydraulic actuator being adapted to engage one of the wheels of the vehicle to be tested;

a hydraulic fluid circuit including the hydraulic actuators;

a controller operatively associated with the hydraulic fluid circuit actuators causing the wheels of the vehicle to be tested to move in a controlled manner relative to the seismic mass;

a utility trailer having an electrical generator and a hydraulic pump, said utility trailer and trailer being linked by electrical wires and hydraulic conduits whereby noise and vibration from the utility trailer is isolated from the trailer and a self sufficient environmental test facility is provided that does not require connection to stationary facilities to operate; and wherein said utility trailer includes a portion of the seismic mass that is disengaged from the utility trailer at a location where the transportable environmental test facility is temporarily installed and the seismic mass of the trailer is connected to the seismic mass disengaged from the utility trailer.

15. The transportable environmental test facility of claim 14 wherein at least one air bag is provided under the seismic masses of the trailer and the utility trailer.

* * * * *